United States Patent

[11] 3,572,927

| [72] | Inventors | Kenneth M. Li Donnici<br>Brooklyn;<br>Richard B. Kosten, Bayside, N.Y. |
|---|---|---|
| [21] | Appl. No. | 772,290 |
| [22] | Filed | Oct. 31, 1968 |
| [45] | Patented | Mar. 30, 1971 |
| [73] | Assignee | Ing C. Olivetti & C., S.p.A. |

[54] REPROGRAPHIC SCANNING OPTICS
6 Claims, 2 Drawing Figs.

[52] U.S. Cl............................................. 355/66, 355/67
[51] Int. Cl....................................... G03b 27/50, G03b 27/70
[50] Field of Search............................ 355/65—67, 8

[56] References Cited
UNITED STATES PATENTS
3,389,635  6/1968  Teutsch........................ 355/66
3,432,234  3/1969  Johnson....................... 355/65X
3,451,752  6/1969  Frank.......................... 355/66X

*Primary Examiner*—Samuel S. Matthews
*Assistant Examiner*—Richard A. Wintercorn
*Attorney*—Kevin C. Mc Mahon ABSTRACT: An optical system in reprographic apparatus having substantially parallel subject and copy planes. A folded optical system is provided in conjunction with orthogonally related mirrors for extending the focal path between the subject and copy planes. The main optical axis of the optical system is tilted relative to the subject and copy planes to gain bulk space for compact packaging. The angular displacement of the main optical axis with respect to the subject and copy planes is compensated for by orienting the orthogonally related mirrors so that a line bisecting the right angle which they form makes an angle with respect to the subject and copy planes of substantially one-half the angular displacement of the optical axis.

Patented March 30, 1971

KENNETH M. LIDONNICI
RICHARD B. KOSTEN
Inventors

By Thomas N. Tarrant
Attorney

REPROGRAPHIC SCANNING OPTICS

BACKGROUND OF THE INVENTION

In today's office copying machines, optical systems most commonly are of the slit-projection type. In slit projection, the original is scanned by a full-width illuminating slit traveling along its length and the latent image is optically formed on the photosensitive medium by the same scanning motion. In some such systems the original and the photosensitive medium move in synchronism to produce the scanning motion. In others, the optics and illuminating slit move. In machines adapted for copying books or other items that are not readily transported for scanning purposes, either full frame exposure or a moving optical assembly are used. The full frame exposure places a large burden on the objective lens and on the illuminating source in order to obtain uniform focus and exposure over the full frame. This problem is magnified when the original is of the 13 or 14-inch length variety which copiers are expected to handle.

In slit exposure systems it has been found advantageous to use a reflex lens in order to fold the optical path so as to increase its length without a corresponding increase in machine dimensions. For purposes of the present invention, a reflex lens is defined as a lens assembly incorporating one or more lens elements and a mirror. The mirror may reflect incident illumination back through the same lens element(s), all lens elements may be either in the path of incident illumination or reflected illumination, or one or more lens element may be in each path. One commonly used reflex lens system utilizes only half the usual lens elements together with a mirror so that there is a double pass through the same lens elements. Such a system is disclosed in U.S. Pat. No. 2,234,717 issued Mar. 11, 1941, to F. E. Altman et al. The Altman scheme has been more recently applied in an office copying machine as disclosed in U.S. Pat. No. 3,207,050 issued Sept. 21, 1965, to W. Limberger. These patents show the original and the imaging medium positioned close together, both facing the reflex lens. The lens, being aimed midway between the two, receives the image light slightly off one side of its optical axis and returns it to the reproducing medium slightly off the other side of its axis. Since a slit is used, both incident and reflected light can pass through a portion of the lens that has nearly the full lens diameter.

In U.S. Pat. No. 3,286,588 issued Nov. 22, 1966, to R. Wick et al., two mirrors were introduced whereby the optical axis of the lens is permitted to lie in a plane parallel to the plane of both the original and the reproducing medium. Austrian Pat. No. 156,885 to Opticolor AG disclosed a similar arrangement in FIGS. 23 and 28.

While for slip exposure the above lens system is very good, there are problems for exposure of a stationary original such as a book. The double pass through the lens aggravates the lens requirements when full frame exposure is used. The full diameter of the lens cannot be used over the whole frame. The obvious answer is to scan by moving the optics as is well known. Here the greatest problem is that the space. The apparatus disclosed by Limberger would be absurdly large at one end for allowing both full original and copy to extend end to end. The Wick et al. arrangement is perhaps more readily adaptable, but the necessity to leave space for a conveniently large copy paper supply raises difficulties. To put the paper supply at one end extends the length of the machine to an inconvenient degree. To put the paper supply under or above the scanning system virtually turns an otherwise tabletop machine into a floor model.

SUMMARY OF THE INVENTION

The present invention provides an optical scanning system in a reprographic machine using a reflex lens traveling in a plane between and parallel to both original and reproducing planes but having its optical axis tilted with respect to said planes, whereby the lens may travel close to one of said original and reproducing planes allowing space between it and the other of said planes for placement of bulky components. Thus, it is an object of the invention to provide an optical scanning system for reprographic machines with reduced space requirements.

It is a further object of the invention to provide a novel optical scanning system in which the scanning array comprises a reflex lens traversing a path between and parallel to both object and image planes and having an optical axis tilted with respect to both object and image planes.

Further objects and features of the invention will become apparent on reading the following description together with the drawings.

DESCRIPTION OF THE PREFERRED EMBODIMENT

Figure 1:
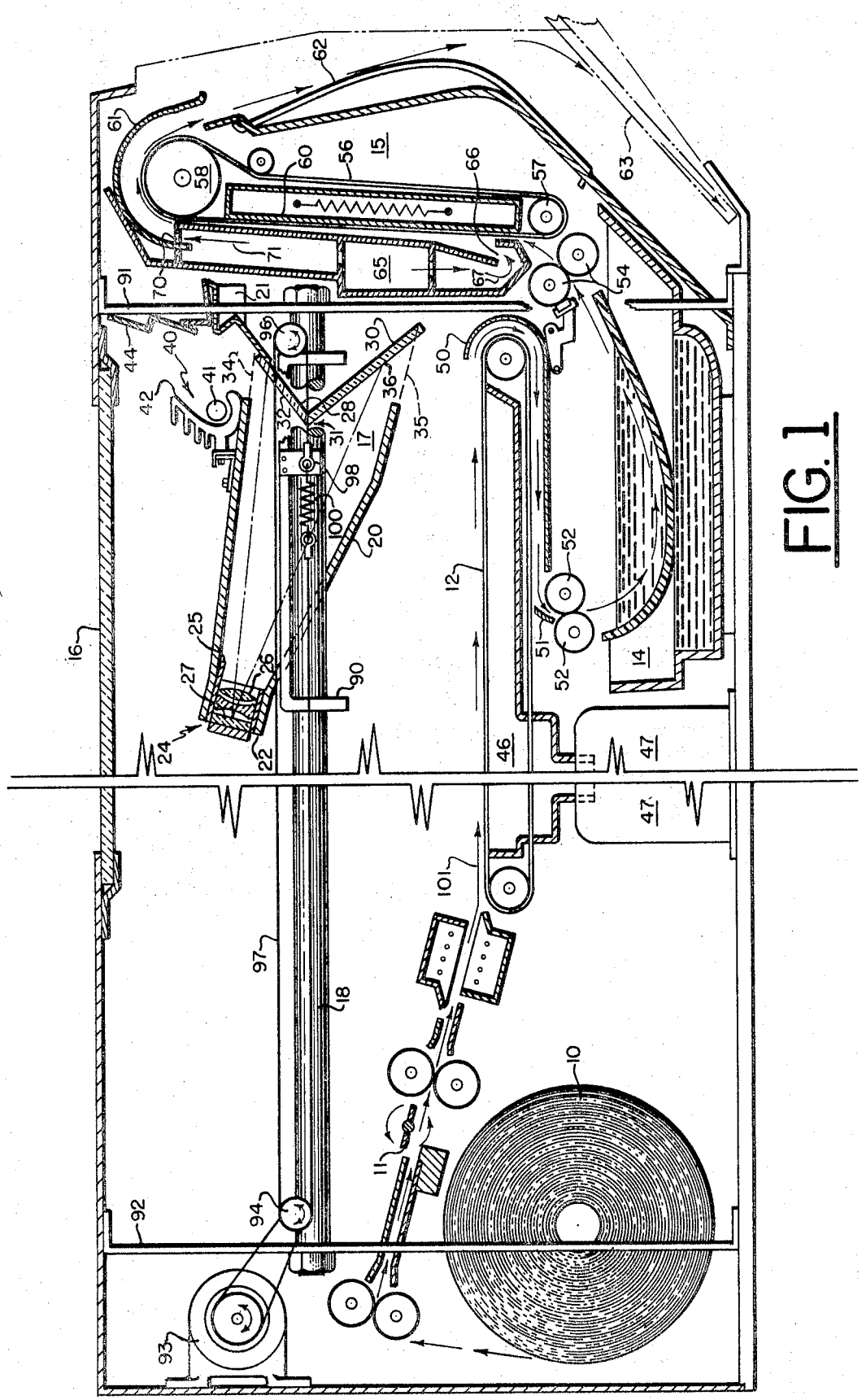
FIG. 1 is a longitudinal section, largely diagrammatic, of an electrostatic copying machine in accordance with the invention.

FIG. 1 is a longitudinal section of an electrophotographic copying machine according to the invention with much of the detail omitted. The main components of the copying machine are depicted. Copy paper supply is shown as paper roll 10 at a first end of the machine. Paper knife 11, of the rotary type, is provided to cut the copy paper to length. A vacuum platen 12 serves as an exposure bed. Platen 12 is essentially in the center of the machine, while knife 11 is between paper roll 10 and platen 12. Underneath platen 12 is developing unit 14. At the opposite end of the machine from paper roll 10 is the drying and output feed system 15.

A stationary subject window 16 for positioning an original to be copied is supported a distance above and facing platen 12. Between window 16 and platen 12 is optical system 17 supported on a pair (one shown) of rods 18 for movement between the ends of the machine.

Optical system 17 has support-housing 20 serving to hold the different components of the optical system rigidly in their respective relative positions. Support-housing 20 also blocks stray light and reduces dust within the optical system.

Housing 20 when moved nearest the end of the machine occupied by output feed system 15, has first end 21 extending beyond subject window 16 and platen 12. In the same position, the opposite end of housing 20 extends far into the space between window 16 and platen 12. In the illustrated embodiment this is slightly more than halfway.

Second end 22 of housing 20 holds reflex lens assembly 24. Lens assembly 24 is a cylindrical case 25 containing an objective lens 26 and a mirror 27. Lens 26 faces end 21 of housing 20. Mirror 27 is behind lens 26 being further from end 21.

Adjacent to end 21, housing 20 supports two mirrors 28 and 30 positioned to form a right angle. Each of the mirrors is rectangular and of a length adequate to intercept the light bundle representing a full width section of a document to be copied. This length is perpendicular to the plane of the drawing and is not shown. Mirrors 28 and 30 are joined along lengthwise edges to form a right angle junction 31.

The opposite lengthwise edges of mirrors 28 and 30 are positioned near end 21 of housing 20 while junction 31 projects toward lens assembly 24. Right angle junction 31 is positioned half the optical distance between the top surface of platen 12 and the top surface of window 16. This middle position of mirror junction 31 gives a 1 to 1 magnification ratio. For other ratios the position can be shifted. The mirror surfaces at junction 31 also lies on the optical axis of lens 26. This latter relation should be held irrespective of magnification ratio.

Reflective surface 32 of mirror 28 is coated on the side of mirror 28 nearest lens assembly 24. This places the reflective surface at the air-mirror interface. While this is not essential, it is desirable to avoid reflective and refractive effects of the glass or other transparent medium that supports the reflective surface. It also permits the reflective surface to be supported by an opaque substrate.

Housing 20 has an opening 34 above mirror 28 to permit light to pass between subject window 16 and mirror 28. Housing 20 also has an opening 35 below mirror 30 to permit light to pass between mirror 30 and platen 12. The reflective surface 36 of mirror 30 is coated on the side nearest lens assembly 24 as in mirror 28. Mounted on top of housing 20 between opening 34 and lens assembly 24 is lamp 40. Lamp 40 has a light source 41 positioned in a reflector assembly 42. Lamp 40 is situated to provide a maximum illumination to a section of window 16 facing mirror 28 through opening 34 without illuminating mirror 28 directly. Electrical means (not shown) are provided for energizing lamp 40.

A second reflector assembly 44 is mounted to the top of housing 20 near end 21 to reflect scattered light back toward window 16.

The whole of housing 20 is canted so that the end carrying lens assembly 24 is entirely above the centerline between the top surface of window 16 and the top surface of platen 12. In the embodiment illustrated and as more clearly shown in FIG. 2, canting of housing 20 shifts the optical axis of lens assembly 24 about 15° from the horizontal axis defined by traverse rods 18.

Canting of housing 20 and the optical system places the lens assembly up close to window 16 leaving sufficient room beneath housing 20 for paper roll 10 and paper knife 11 when optical system 17 is moved to that end of the copying machine.

Platen 12 is supported adjacent to a plenum 46, which is evacuated by a blower 47. Apertures in platen 12 provide a rarefied pressure zone over the top surface of platen 12. The low-pressure zone holds a copy sheet flat on platen 12 during exposure. Turnaround shield 50 at the end of platen 12 guides copy paper back below the platen to second deflecting shield 51 and a pair of pinch rollers 52.

Shield 51 deflects copy paper down into the nip of rollers 52, which are arranged to drive the copy paper into developer tray 14. Second pair of pinch rollers 54 are positioned to catch copy paper leaving developer tray 14 and direct it against vertical-moving drying belt 56. Rollers 54 are adapted to remove excess developer liquid from copy paper.

Belt 56 is supported on rollers 57 and 58. Roller 57 is driven by a motor (not shown) whereby belt 56 rises vertically adjacent to rollers 54 and descends adjacent to the end of the copying machine farthest from paper roll 10. Electrically heated plate 60, positioned adjacent to the back of the rising portion of belt 56, heats belt 56 to a drying temperature.

Turnaround shield 61 positioned above roller 58 is arranged to deflect copy paper around roller 58 and down out of the end of the machine.

A series of curved rods 62 serve to guide the output path of the paper. Hopper 63 connected to the end of the machine catches the copy paper leaving the machine and serves as an output basket.

Plenum chamber 65 pressurized by a blower (not shown) extends across the vertical-rise face of belt 56. Output passage 66 indicated by arrow 67 is arranged to provide a flow of pressurized air against the rising surface of belt 56. Output passage 70 indicated by arrow 71 is arranged to provide an additional flow of pressurized air against the bottom of concave side of turnaround shield 61.

Figure 2:
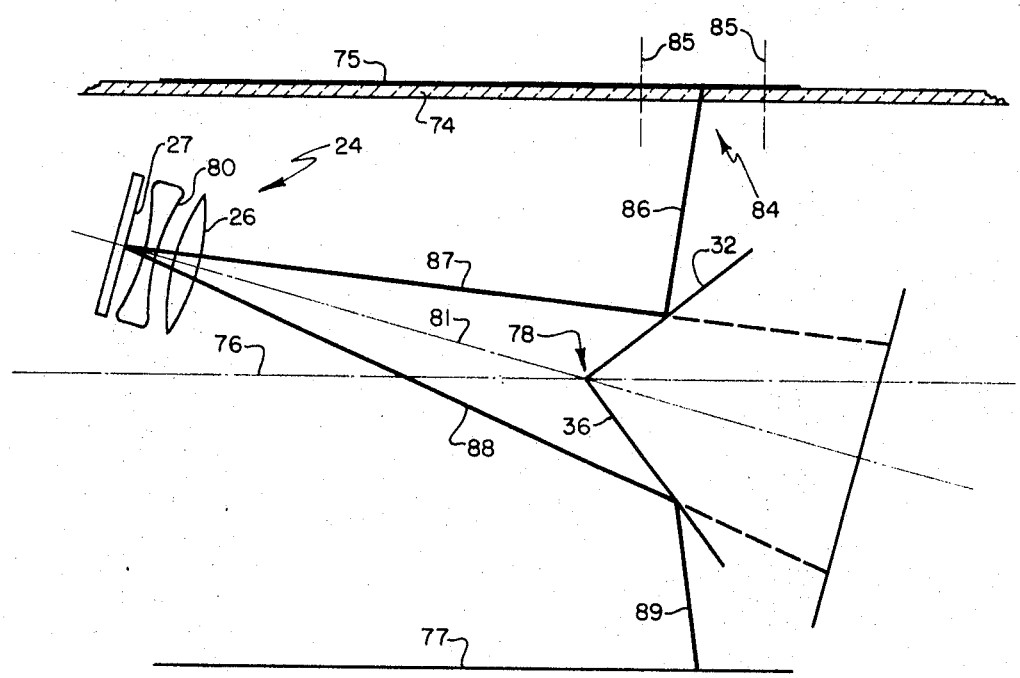
FIG. 2 is a diagram depicting the optical system of the invention.

The optical system is best explained with reference to FIG. 2 which is primarily a ray diagram. FIG. 2 contains three parallel planes: subject plane 75, central plane 76 and copy plane 77. For a 1 to 1 magnification ratio, central plane 76 should be midway between planes 75 and 77. However, this midway position is by optical distance rather than physical distance. Since the original being reproduced will commonly lie on glass panel 74, the optical path length through the glass must be considered. Since glass provides an optical path shorter than an equivalent thickness of air, the subject plane 75 is slightly further from central plane 76 than is copy plane 77. In one embodiment having a ⅛-inch glass panel, 74, this difference in physical distance is about 0.042 inches.

The optical system is arranged around common point 78 situated on the central plane. Two mirrors 28 and 30 (FIG. 1) are joined at their reflective surfaces 32 and 36 along one edge of each to form a right angle with its apex passing through common point 78. Thus planes represented by reflective surfaces 32 and 36 of mirrors 28 and 30 each intersect with common point 78.

Lens assembly 24, herein called a reflex objective lens, is depicted as comprising two lens elements 26, 80 and a mirror 27. The lens elements comprise one half of a usual symmetrical objective lens and the reflective surface of mirror 27 is placed at what would be the center of such symmetrical lens. Light entering the lens is reflected back through the same lens elements by mirror 27 so that the lens operates as a complete symmetrical objective lens.

In FIG. 2 the optical axis 81 of lens assembly 24 intersects with common point 78 at an angle of 15° with central plane 76. This places lens assembly 24 nearly in the center of the space between central plane 76 and glass panel 74.

In the prior art as depicted by FIGS. 23 and 28 of Austrian Pat. No. 156,885, the optical axis of the lens assembly lies along central plane 76. The optics in this prior art arrangement become quite simple, and the mirror surfaces 32 and 36 form a right angle that is bisected by the optical axis of the lens.

Tilting the optical axis of lens assembly 24 as in the present invention requires a compensating adjustment of mirrors 28 and 30 (FIG. 1). For purposes of the present invention it has been found that an adequate compensation is obtained by rotating the right angle mirror assembly consisting of mirrors 28 and 30 about common point 78 in the same angular direction but only one half the angular displacement by which the lens axis is tilted.

Thus if optical axis 81 of lens assembly 24 is tilted 15° from central plane 76 at common point 78, then the bisector of the mirror assembly will be tilted 7½° from central plane 76.

Depending on the focal length of the lens, magnification ratio and image size, the tilt of optical axis 81 can be varied in the general range of 5° and 30° with respect to central plane 76 to obtain the packaging advantage of the present invention. For a longer focal path the tilt angle will be less and vice versa. Whether or not the optical axis is tilted clockwise or counterclockwise is determined by whether the additional bulk space is desired above or below central plane 76.

Perception aperture 84 is depicted in FIG. 2 by two dashed lines 85. The center of the image field of aperture 84 through the optical system is represented by a series of rays 86, 87, 88 and 89. 86 is the ray of incidence to mirror surface 32 from subject plane 75. Ray 87 is the ray of incidence to lens assembly 24 from mirror surface 32. Ray 88 is the ray of reflection from lens assembly 24 and incidence to mirror surface 36. Ray 89 is the ray of reflection from mirror surface 36 and incidence to copy plane 77.

Referring again to FIG. 1, housing 20 is slidably mounted on rods 18 by means of mounting members 90 (not shown). Rods 18 are supported at each end by vertical support members 91 and 92. Reversible electric motor 93 provides scanning motion to the optical system by means of drive pulley 94 near one end of rods 18, idle pulley 96 near the other end of rods 18, and cable 97. Pulleys 94 and 96 are fixed to the main apparatus structure by frame members (not shown). One end of cable 97 is fixed to mounting members 90 by terminal 98. Cable 97 makes a complete loop around both pulleys 94 and 96 and the other end of the cable is connected via spring member 100 to terminal 98.

The copy paper flow in the operation of the reprographic apparatus illustrated in FIG. 1 is depicted by dash line 101. The copy paper leaves paper roll 10 and passes through a first set of drive rollers to a paper knife 11. From the paper knife, it passes through a second set of drive rollers to a vacuum platen 12.

The apparatus in FIG. 1 is depicted as an electrophotographic machine and includes a dual corona, charging or sensitizing device between the paper knife and the vacuum platen. After a predetermined length of the copy paper—for example, 11-inch standard or 14-inch legal—has passed paper knife 11, the knife is actuated to cut the paper.

The vacuum pulled against vacuum platen 12 by blower 47 operating through plenum chamber 46 holds the copy sheet firmly against platen 12 for exposure and movement. Apertures for air passage (not shown) are provided in platen 12 for this purpose. After the copy sheet has reached the exposure position on platen 12, scanning motor 93 is actuated to move optical system 17 in a pass over platen 12 so that it scans an original to be copied situated on subject window 16 and provides an image on the copy sheet.

As optical system 17 moves, light from source 41 is directed against a portion of the original being copied and is reflected in image configuration through aperture 34 onto mirror surface 32. From mirror surface 32 the image illumination is reflected through lens 26 to mirror 27, which in turn reflects it back through lens 26 to mirror surface 36. From mirror surface 36 the image illumination is reflected through aperture 35 onto a segment of the copy sheet.

After the copy has been completely exposed to the image, light source 41 is extinguished and optical system 17 returns to its starting position. At the same time, platen 12 is restarted and carries the exposed copy paper through turnaround 50 to pinch rollers 52, which drive the copy sheet through developing unit 14. Developing unit 14 is depicted as a liquid developer processing station in which a liquid developer carries a suspension of electroscopic ink particles.

As the developed copy sheet leaves developing unit 14 it is picked up by pinch rollers 54, which serve both to drive the developed copy sheet forward to output system 15 and, at the same time, to remove excess liquid from the sheet. Pinch rollers 54 drive the copy sheet against vertically moving belt 56. As the copy sheet starts moving upward with belt 56 a jet of air from a blower (not shown) through plenum 65 is directed by passage 66 against the copy sheet to press the copy sheet against belt 56 while at the same time providing a drying flow of air. Additional drying is provided by heated plate 60 contacting the back surface of belt 56. Heated plate 60 heats belt 56, which in turn heats the copy sheet for drying. Belt 56 carries the copy sheet vertically to a turnaround 61. The output of turnaround 61 directs the copy sheet against curved rods 62, which serve to guide the copy sheet into output hopper 63.

An additional air jet through passage 70 from plenum 65 facilitates the movement of the copy sheet in the output path. As the leading edge of the copy sheet reaches passage 70 adjacent to turnaround 61, the air flow from passage 70 pushes the leading edge of the paper around in a curved manner assisting the turnaround shield.

As the lagging edge of the sheet reaches turnaround 61, the sharply curved path causes the rear edge of the sheet to kick out against the turnaround so that the air flow switches from the image side of the copy sheet to the back side. This air flow follows the lagging edge of the copy sheet to the output feed end of turnaround 61 and pushes the lagging edge of the copy sheet outward away from the machine so that the copy sheet stacks properly in hopper 63.

This proper guidance of the output path with the air flow is particularly significant in reprographic apparatus of the type depicted in FIG. 1 since the copy paper originating from a roll tends to curl so that there is a tendency for the outcoming sheet to curl in upon itself with consequent disruption of stacking.

The scanning optical system of the present invention has been described with respect to an electrophotographic copying system. It is equally useful in photographic and other copying apparatus using optical scanning. The particular attitude of the components is in no way critical and the entire arrangement can be inverted or rotated about any of its three orthogonal axes.

Thus it is intended to claim the invention broadly within the spirit and scope of the appended claims.

We claim:

1. A scanning optical system in reprographic apparatus comprising:
   a. means to support an original to be reproduced in a first plane;
   b. means to support photosensitive reproducing material in a second plane spaced from and parallel to said first plane;
   c. an optical scanning assembly comprising:
      1. an illuminating source arranged to illuminate a slip portion of said first plane;
      2. a first mirror positioned to receive illumination reflected from said slit portion;
      3. a reflex lens positioned to receive illumination reflected by said first mirror; and
      4. a second mirror joined to said first mirror to form a right angle therewith receiving illumination from said reflex lens and for reflecting said received illumination onto a slit portion of said second plane.
   d. Scanning assembly support means positioning said scanning assembly intermediate of said first plane and said second plane with said reflect lens positioned on one side of a central plane midway between and parallel to said first and second planes with said reflex lens disposed with its optical axis tilted at an angle with respect to said central plane and with said mirrors being disposed so that a line bisecting the right angle which they form forms an angle of substantially one-half the magnitude of the angle which said optical axis makes with said central plane in the same direction as the angle of said optical plane; and
   e. means to move said scanning assembly back and forth parallel to said central plane whereby said illuminating source scans said first plane and light reflected from said first plane scans said second plane.

2. A scanning optical system according to claim 1 wherein said reflex lens is positioned between said first plane and said central plane.

3. A scanning optical system according to claim 1 wherein said reflex lens comprises a symmetrical half of the lens elements of a complex objective lens and a mirror element positioned to reflect incident illumination back through said half whereby said half is optically operative as a symmetrical whole complex objective lens.

4. A scanning optical system according to claim 1 wherein each of the listed components comprising said optical scanning assembly are rigidly interconnected whereby the relative positions of said components remain fixed during motion of said scanning assembly.

5. A scanning optical system according to claim 1 wherein the reflective surface of each of said first mirror and said second mirror is at the air-mirror interface.

6. A scanning optical system according to claim 1 wherein the optical axis of said reflex lens, the plane axis of said first mirror, the plane axis of said second mirror and the axis of said central plane all intersect at a common point.